VIBRATION PROCESSING OF MAGNETIC TAPE

Filed Jan. 21 1969

INVENTOR.
GEORGES D. ABITBOUL
BY White & Haefliger
ATTORNEYS.

United States Patent Office 3,676,216
Patented July 11, 1972

3,676,216

VIBRATION PROCESSING OF MAGNETIC TAPE

Georges D. Abitboul, Los Angeles, Calif., assignor to Audio Magnetics Corporation, Gardena, Calif.

Filed Jan. 21, 1969, Ser. No. 792,464
Int. Cl. H01f *10/00*
U.S. Cl. 117—237 6 Claims

ABSTRACT OF THE DISCLOSURE

Ultrasonic processing of the magnetizable material coating on magnetic tape means renders the coating thickness more nearly uniform and thus improves tape quality and fidelity of reproduction. Improved tape handling techniques for such processing are provided including gas bearing biasing of the tape toward the processing head.

BACKGROUND OF THE INVENTION

(1) Field of the invention

This invention has to do with improvements in recording and reproduction by electromagnetic means, and is particularly concerned with improved magnetic tape means and methods and apparatus for rapidly and inexpensively producing the same for the purpose of realizing improved levels of fidelity in the recordation and reproduction of program material.

Magnetic tape means typically comprise a backing of tough flexible material such as plastic, e.g. polyester, film which is electrically nonresponsive, high in tensile strength and abrasion resistant, and a magnetically responsive coating which is applied to the backing typically by solvent based adhesive techniques. The resulting tape is wound on a reel for use in various devices for recording patterns of electromagnetic radiation corresponding to a light and/or sound program source applied to the tape by an electromagnetic head.

Present day tape backing is ultra-thin, often one mil or less, in thickness, and the magnetic coating thereon may be as little as one or two tenths of a mil. These dimensions pose tremendous problems in attempting to produce at commercially feasible rates a uniform, high quality tape product. Variations in tape thickness, irregularity in the coating material or its application each can cause non-uniformity in the coating thickness of the tape product and lower quality.

(2) Prior art

Presently, adaptations of coating techniques previously used and developed for application of thicker coatings to substrates having smaller percent thickness variations along their length such as solution coating followed by a doctor blade or other leveling device have been found wanting in attempting to produce a highly uniform product where the tape material is ultra-thin and the coating only a small fraction of the tape thickness. Similarly, calendering of coated ultra-thin material is subject to sticking and hang-ups on the rolls.

SUMMARY OF THE INVENTION

It is a major objective of the present invention to provide method and apparatus for producing a commercial vide highly uniformly coated magnetic tapes by utilization of ultrasonic energy treatment of a coated tape. Such treatment transmits vibrations to the tape which render of more nearly uniform thickness a previously applied magnetic coating material.

In particular, the invention provides apparatus for improving the quality of elongated magnetic tape means formed from a backing and a coating thereon of magnetizable material comprising means for generating ultrasonic vibrations and means for passing the tape means lengthwise relatively past the generating means and in such close proximity thereto that the vibrations are transmitted to the tape means, whereby the thickness of the magnetic coating is made more nearly uniform. The tape means may be passed lengthwise of the vibration generating means, which is typically a vibrating head extending transversely of the tape means travel direction, drawn past the head by a drawing means, optionally at a tape width greater than ultimately required and through a slitting means beyond the head for slitting the tape into required widths.

An important feature of certain embodiments of the invention is provision of means to urge local portions of the tape means nearest the vibrating head toward the head. This urging may be effected by gas jetting means resiliently supported adjacent the tape backing for impinging a stream of gas against the tape means to displace toward the head the tape with the coating facing the head.

The present method for improving the quality of elongated magnetic tape means includes generating ultrasonic vibrations at a source to pass the tape means lengthwise relatively past and in such close proximity to the source that the vibrations are transmitted to the tape whereby the thickness of the magnetic coating is made more nearly uniform. The tape means, which may have a gauge of one mil or less may be ultrasonically treated as a sheet having a width at least twice the width of the ultimate tape to be formed and a sheet slitting step may be provided following tape sheet movement relative to the source.

The method further may include continually urging the tape means local portion nearest the source with its coating facing the source theretoward as by directing a stream of gas toward the backing side of the tape portion and/or urging a body resiliently toward the backing side of the tape means portion while directing the gas stream between the body and the tape portion to form an air bearing therebetween.

DESCRIPTION OF THE PREFERRED EMBODIMENTS

Figure 1:
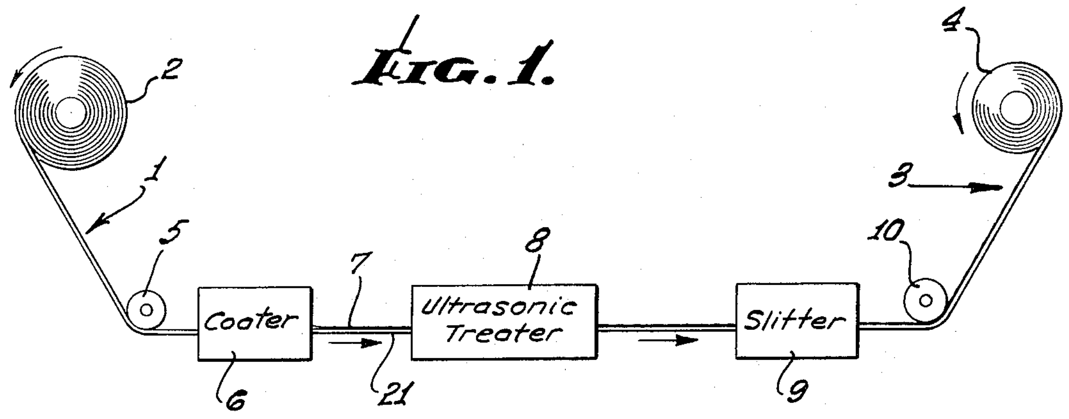
FIG. 1 is a schematic view of a tape means forming line including a sheet ultrasonic treater.
Figures 2, 3:
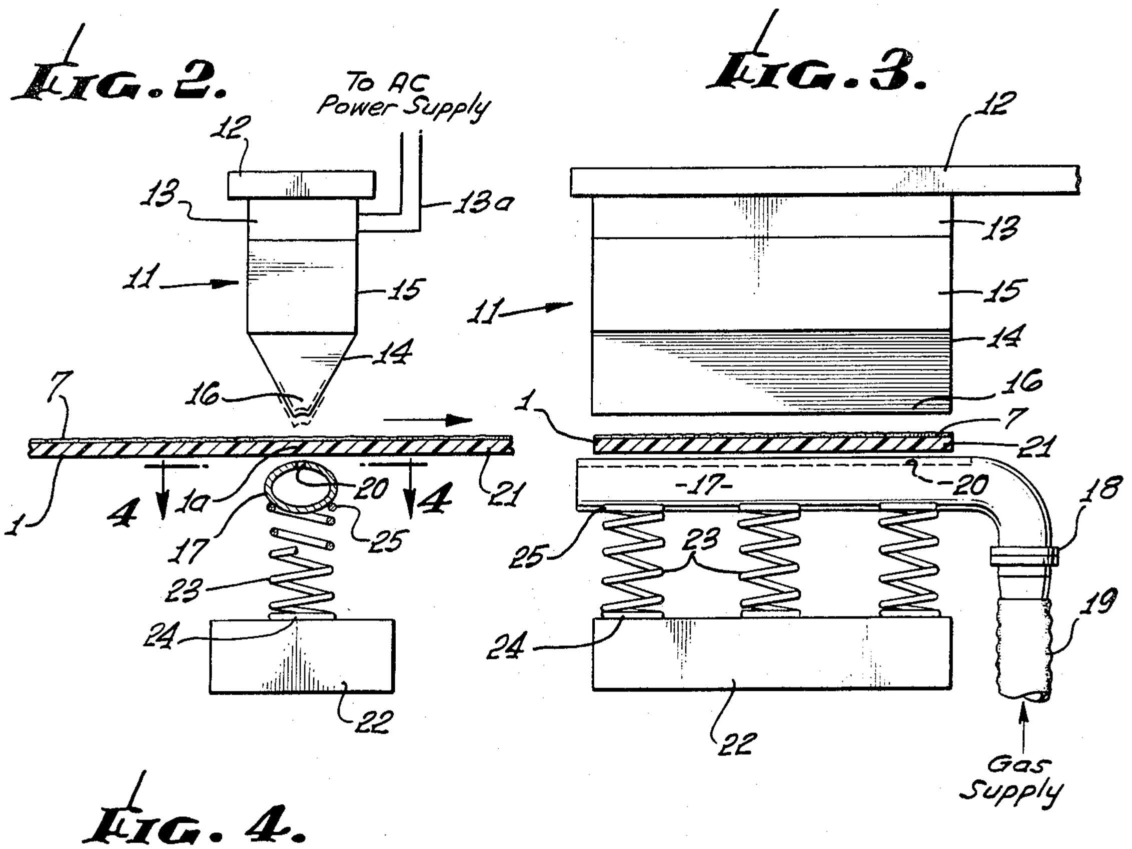
FIG. 2 is a diagrammatic side view of an ultrasonic treater.
FIG. 3 is a view of the treater of FIG. 2 from the front.

With reference now to the drawings in FIG. 1 apparatus is shown for converting sheet material 1 from supply roll 2 into magnetic tape means 3 being wound on take-up roll 4. The sheet 1 may be any material suitable for use as a backing for magnetic tape. Thus self-supporting films of cellulose acetate, Mylar (polyester) and polyolefin having thicknesses in the range of 2 to 0.5 or even 0.25 mil may be used providing sufficient tensile strength is maintained. The sheet 1 typically wider than ultimately required for the magnetic tape to be produced is drawn over an idler roll 5 and into a coater 6. Coating operations are conventional herein and may comprise application within coater 6 of magnetizable material such as $Fe_2O_3$ in a liquid binder such as vinyl resin in an organic solvent and evaporation of the solvent to leave the magnetizable material 7 adhered to the sheet 1 as best shown in FIGS. 2 and 3 and typically at thicknesses of 0.1 to 0.2 mil. One or both sides of the sheet 1 may be so coated as desired.

Following coating the sheet 1 is passed to the ultrasonic treater 8. The treater 8, to be later described in detail, processes the coating material 7 adhered to the sheet 1 with ultrasonic vibrations to smooth irregularities in the coating and render more uniform and consistent the distribution thereof over the sheet material 1 surface. The coated sheet 1 emerging from the treater 8 is drawn to and through slitter 9 where the sheet which may originally have had a width two or many times the width ultimately required in the magnetic tape means 3 is slit lengthwise to appropriate, requried widths of magnetic tape and passed around idler 10, drawn by take-up roll 4.

The treater 8 comprises an ultrasonic generator or insonator which produces high frequency vibrations >16,000 cycles per second which bombard the coated tape passing thereby and in that manner ameliorate nonuniformities of the coating as it emerges from the coater, i.e. smoothing the coat.

FIGS. 2 and 3 depict one form of suitable ultrasonic treating device. As there shown an ultrasonic generator 11 is carried downwardly suspended from a support arm 12 fixed to a frame not shown. The generator 11 comprises a transducer 13 which may be of the magnetostrictive type in which alternating voltages induce vibration producing oscillating core movement within a coil or of the piezoelectric type in which application of alternating voltages on opposite sides of a crystalline or ceramic material sets up vibratory movement. In either case the transducer 13 having AC power connection at 13*a* is secured to a vibrating head 14 which as shown may be a metal block 15 downwardly wedge-shaped to form a blade 16 which is sized to extend over the width of the sheet 1 for subjectiing all portions of the sheet to ultrasonic vibration processing.

Figure 4:
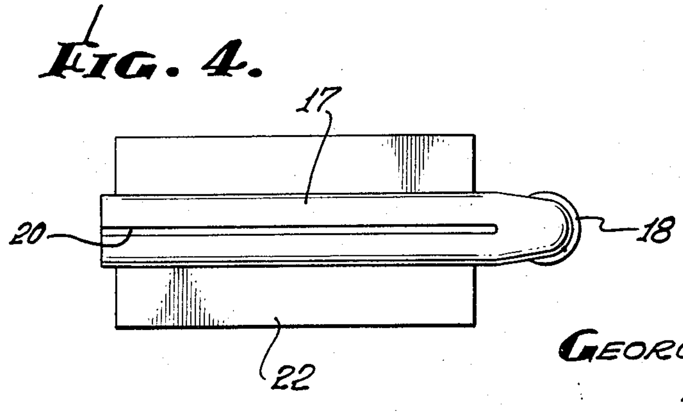
FIG. 4 is a plan view of a form of the tape urging means, taken on line 4—4 in FIG. 3.

Because the vibrations emanating from the head 14 tend to drive the sheet 1 downward and away in the local sheet portion 1*a* immediately adjacent the blade 16 with consequent attenuated and less effective vibration activity, there is provided herein means for overcoming such tendencies and achieving continuing close relation between the vibrating head 14 and sheet portion 1*a*. With reference to FIGS. 2–4 means for urging the local sheet portion 1*a* toward the vibrating head 14 is shown in the form of a gas jetting tube 17 underlying the sheet portion 1*a* and connected at 18 to a gas, e.g. air supply (not shown) through flexible conduit 19. An elongated and narrow slot opening 20 in the uppermost portion of the tube 17 directs gas in a narrow wall vertically upward to impinge on the backing 21 of sheet 1 opposite from the coating material 7 which faces the vibrating head 14. It will be apparent that the relative orientation of head 14, jetting tube 17 and sheet portion 1*a* is not necessarily as shown, i.e. vertically spaced with the vibrating head uppermost. The positions of the parts may be reversed or the parts may be spaced horizontally with the sheet 1 movement vertically since what is required is that a sheet material portion 1*a* pass between the gas jetting from opening 20 and vibrating head 14 with each tending to urge the sheet material in opposing directions.

For increased ease in handling the tape being drawn lengthwise between the head 14 and tube 17, the tube may be mounted to resiliently adjust to varying tensions on the sheet 1 and to remain in continuous close proximity to the sheet. Thus a support body such as block 22 may be provided for supporting the tube 17 in desired position, the tube itself being carried by a compression spring 23 connected to the block at their lower end 24 and to the tube 17 at their upper end 25. In this manner the tube 17 is continually resiliently and controllably urged upwardly toward the sheet 1 while gas jetting from opening 20 serves to displace the sheet portion 1*a* thereopposite toward vibrating head 14. The ultrasonic vibrations emanating from the head 14 act against upward displacement of the sheet portion 1*a* with the net result of the sheet portion being suspended between the tube 17 and the head 14 during ultrasonic processing. The gas from tube 17 thus serves to ease passage of the sheet 1 past tube 17 in the manner of a gas bearing and simultaneously biases the sheet 1 toward the vibrating head 14 for more effective processing. In the absence of such gas jetting, the tube 17 would press against the backer 21, due to the force of spring 23.

I claim:

1. The method of improving the quality of elongated magnetic tape means comprising a coating of magnetizable material in a substantially solvent free resinous binder adherent to a backing, that includes generating ultrasonic vibrations at a source having a relatively narrow blade tip that is elongated transversely of the tape means length, orienting a tape urging means to extend in alignment with and spaced from the tip, and effecting relative movement of the tape means and said tip to pass the tape means with the coating facing the tip lengthwise relatively past and in such close proximity to the tip and said urging means that the tip tends to urge the tape means toward said urging means operating to urge the tape relatively toward the tip so that all the vibrations are transmitted from said tip to the tape means located directly opposite said tip to progressively locally smooth the coating continuously along the tape length.

2. The method claimed in claim 1 wherein said tape means forms a sheet having a width at least twice the width of the ultimate tape to be formed from said sheet, and including the step of slitting said sheet to form the ultimate tape after said relative movement is effected.

3. The method of claim 2 wherein the gauge of the tape means is less than one mil.

4. The method according to claim 1 wherein said urging step is effected at least in part by jetting a stream of gas toward the backing side of said local portion of the tape means.

5. The method according to claim 4 wherein said urging step also includes resiliently urging a body toward said tape means portion at the backing side thereof while directing said gas jetting between said body and said tape portion to form an air bearing therebetween.

6. The method of claim 5 wherein said relative movement of the tape and source is effected by pulling the tape lengthwise and between said tip and said body.

References Cited

UNITED STATES PATENTS

| | | | |
|---|---|---|---|
| 2,097,601 | 11/1937 | Potdevin | 117—VIB |
| 2,200,155 | 5/1940 | Camp et al. | 117—VIB |
| 2,252,345 | 8/1941 | Johnson | 117—Air Blast |
| 2,522,082 | 9/1950 | Arnold | 117—VIB |
| 2,778,744 | 1/1957 | Holt | 117—64 X |
| 3,012,901 | 12/1961 | Reese | 118—57 U |
| 3,023,123 | 2/1962 | Colwill et al. | 117—237 X |
| 3,104,983 | 9/1963 | Tarwater et al. | 117—237 |
| 3,261,706 | 7/1966 | Nesh | 117—237 |
| 3,533,836 | 10/1970 | Massengale et al. | 117—235 |

WILLIAM D. MARTIN, Primary Examiner

B. D. PIANALTO, Assistant Examiner

U.S. Cl. X.R.

117—4, 64, 235; 118—38, 57